Figure 1:
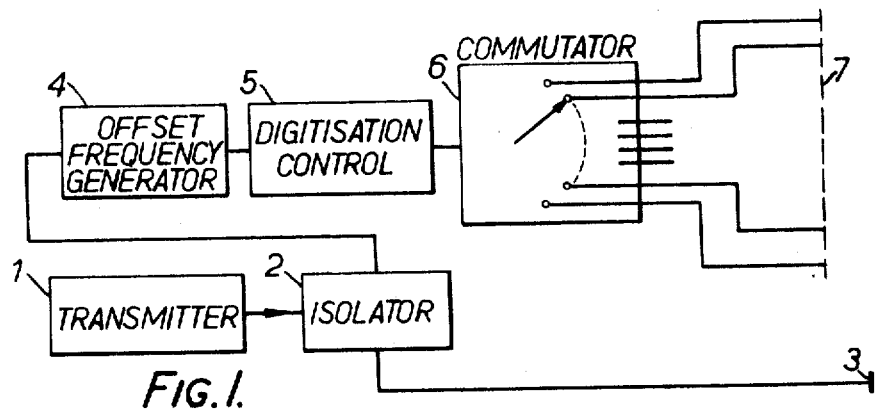

United States Patent [19]
Birchenough

[11] 3,845,486
[45] Oct. 29, 1974

[54] DOPPLER MICROWAVE LANDING SYSTEMS

[75] Inventor: John Peacock Birchenough, Chichester, England

[73] Assignee: Plessey Handel und Investments A.G., Zug, Switzerland

[22] Filed: Jan. 3, 1973

[21] Appl. No.: 320,811

[30] Foreign Application Priority Data
Jan. 4, 1972  Great Britain .................... 335/72

[52] U.S. Cl. ...................... 343/106 D, 343/108 M
[51] Int. Cl. ........................................... G01s 1/38
[58] Field of Search .............. 343/106 D, 108 M

[56] References Cited
UNITED STATES PATENTS

| | | | |
|---|---|---|---|
| 3,173,140 | 3/1965 | Hansel | 343/106 D |
| 3,183,507 | 5/1965 | Hansel | 343/106 D |
| 3,670,337 | 6/1972 | Earp et al. | 343/106 D |
| 3,670,338 | 6/1972 | Earp | 343/106 D |
| 3,728,729 | 4/1973 | Overbury | 343/106 D |

OTHER PUBLICATIONS
Electrical Communications, "Doppler Scanning Guide Systems," by Earp et al., Vol. 46, No. 4, 1971.

*Primary Examiner*—Maynard R. Wilbur
*Assistant Examiner*—T. M. Blum
*Attorney, Agent, or Firm*—Scrivener, Parker, Scrivener & Clarke

[57] ABSTRACT

In a ground station providing guidance to aeroplanes, microwave energy is transmitted from a reference aerial and a vertical array of radiating elements along which the signal is commutated. The frequency of the transmitted signal supplied to the array is offset positively or negatively according to the direction of scan with respect to the signal fed to the reference aerial. The doppler shift between the signal from the reference aerial and the signal from the array as detected in an aircraft indicates elevation of the aircraft. Reversal of the frequency applied to the array is arranged to occur at a crest or a trough of the doppler frequency, so that discontinuities or cusps are not produced in the doppler signal at this time.

3 Claims, 5 Drawing Figures

DOPPLER MICROWAVE LANDING SYSTEMS

The present invention relates to aircraft landing systems and more particularly is relates to a landing system known as the Doppler Microwave Landing System or Doppler M.L.S.

Doppler M.L.S. comprises a ground transmitter and an aerial array from which transmitted signals are received by an approaching aircraft and processed to afford on the one hand an azimuth angular component or azimuth angle indication with respect to a predetermined flight path, and on the other hand an elevation component or an indication of aircraft approach slope angle. A horizontal aerial array is provided for azimuth signal components and a vertical array is provided for elevation signal components. For the purposes of the present invention elevation components only will hereinafter be considered but it is to be understood that similar considerations apply to azimuth components.

Signals from the ground transmitter are commutated from element to element of a vertically disposed multi-element aerial array thereby to simulate signal transmission from an aerial moving in the vertical plane. A reference signal is also transmitted but from a fixed position at the lower end of the vertical aerial array and thus an aircraft receiving both the reference signal and the commutated signal will be able to detect a doppler frequency shift therebetween, dependent on its position relative to the array, which is brought about by the simulated movement of the aerial as commutation is effected, which varies the transmission path length. This doppler frequency shift is indicative of the elevation angle of the aircraft with respect to the aerial array and for a given system may be expressed as a predetermined number of hertz per degree for small angles of elevation.

Except for certain applications, such as use of the system in connection with helicopters or VTOL aircraft, which may require slope approach angles of 20° or 30°, for fixed wing aircraft the angles of interest are generally between 0° and 5° and for these small angles, doppler shift frequency in hertz may be considered to be proportional to the slope approach angle of the aircraft in degrees. For the larger angles as may be required by VTOL aircraft or helicopters corrections may be applied and the system is still operational.

Doppler M.L.S. is well known and attention is hereby directed to an article entitled "Doppler Scanning Guide Systems" by C. W. Earp, F. G. Overbury and P. Sothcot, published in Electrical Communications, volume 46, No. 4, 1971. The theoretical considerations and mathematics associated with the systems are fully discussed in the foregoing article. It will be appreciated from the following description and from the article just before referred to that one part of the transmitted signal is commutated from element to element in one direction at a predetermined rate until the last element of the multi-element array is reached and then the scan is reversed, the signal then being commutated from element to element in the opposite direction, this process being repeated continuously.

In known systems it is usual for the scan frequency to be offset from the reference frequency by an offset frequency so that an aircraft detects this frequency difference in addition to the doppler frequency shift. The offset frequency is added to the scan frequency for commutation in a downward direction along the aerial and subtracted from the scan frequency for upward directions of commutation. This is done to avoid certain unwanted signals which would otherwise be objectionable and the reasons for applying this technique are fully described in the article just before referred to. (Electrical Communications). At the point of scan reversal the scan frequency is thus changed which can result in discontinuities or cusps occurring in the beat frequency between scanned and referenced frequencies. In addition to cusps occurring in the wanted transmitted signal, ground reflections are also present which contain cusps which can result in unwanted signals falling within the doppler frequency pass band. One main object of the present invention is to at least reduce the number of cusps occurring in a doppler M.L.S. system.

According to the present invention a ground station of a doppler microwave landing system comprises an aerial array having a plurality of elements and adjacent one end of said array a reference aerial, transmitter means providing the reference aerial with a reference signal and the aerial array with a scanned signal frequency which is offset by a predetermined offset frequency from the reference signal, commutator means operative to feed said scanning signal sequentially to the elements of the array so that a point from which signal transmission occurs is scanned from one end to the other of the said array and back again, and means for arranging that the scanning frequency is changed by twice the offset frequency when that element of the said array which is closest to the said reference aerial is fed by said commutator means with said scanned signal frequency and when the rate of change of amplitude of the beat frequency difference between the reference frequency and the scanning frequency is zero.

Thus instead of merely changing the scanning frequency when the scan is at the bottom end of the array irrespective of the state of the phase of the beat frequency, the invention provides that a further condition is imposed so that the rate of change of amplitude of the beat frequency is also taken account of and must be zero, i.e. the beat frequency must have arrived at a positive or negative peak. In this way the cusp formation is obviated for scan reversals at the lower end of the aerial.

In one embodiment of the invention the scanning frequency and the reference frequency may be fed to a frequency discriminator effective when the signals applied thereto are in phase or in anti-phase to provide an output signal to gating means fed also from the commutator means the gating means being operative to provide an output signal to effect the required frequency change when the scanning signal frequency is applied to that aerial element of the array which is nearest to the said reference aerial.

It will be appreciated that when the element of the array adjacent the reference aerial is radiating throughout space, there will be no doppler shift signal occurring between the reference frequency and the scanning frequency since they are emanating from substantially the same point. Thus by arranging that the frequency change is introduced at this time, cusps normally associated with scan reversal at the lower end of the scan are removed and not seen by any aircraft receiving the Doppler M.L.S. signal.

Figure 4:
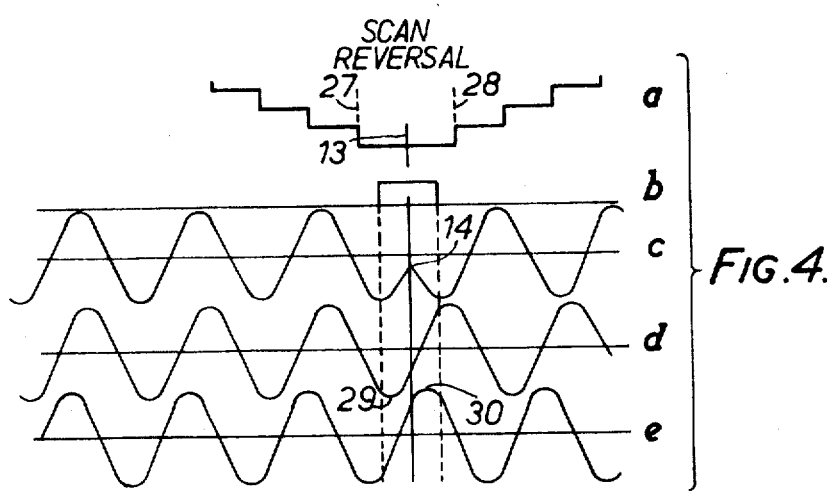
Figure 5:
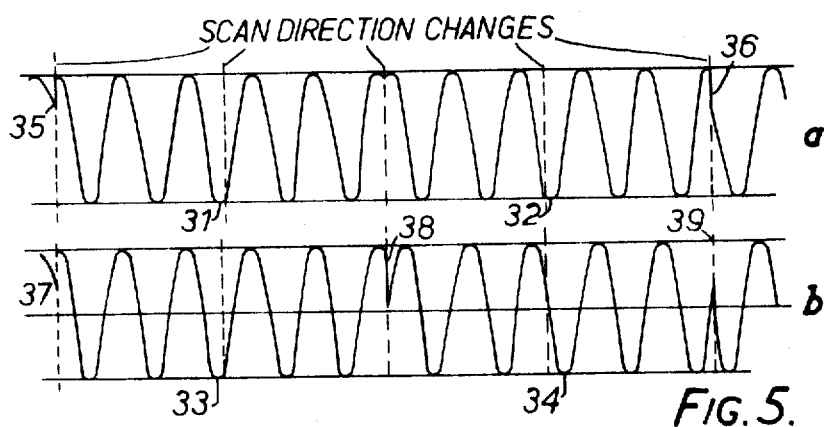
Figure 2:
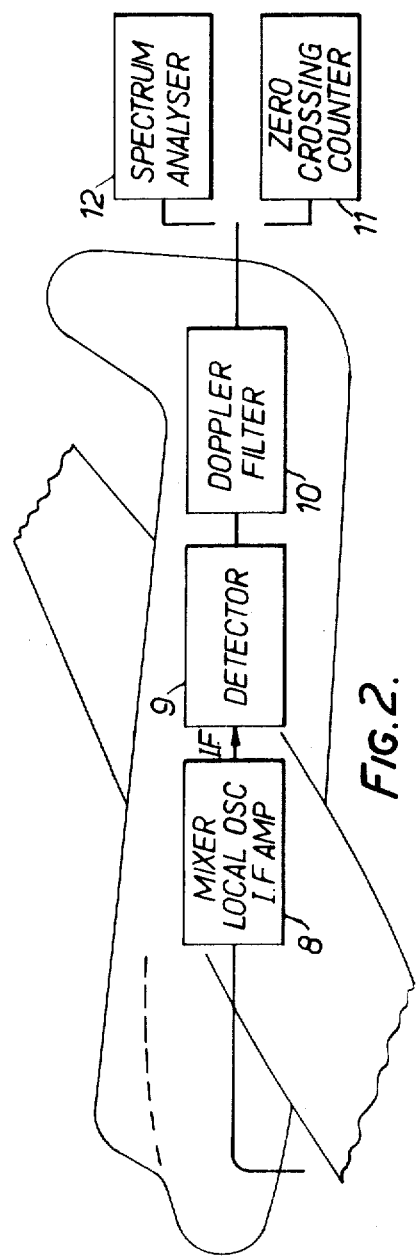
Figure 3:
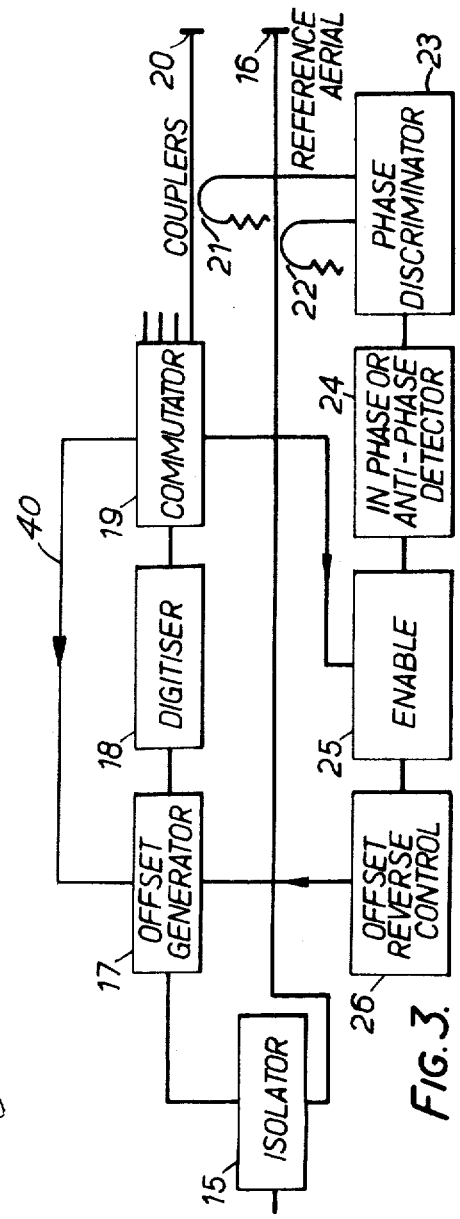

For a better understanding of the invention, reference should now be made to the following description of an exemplary embodiment wherein reference is made to the accompanying drawings, in which:

FIG. 1 is a block schematic diagram of part of a ground station of a known doppler microwave landing system, FIG. 2 is a block schematic diagram of a known system carried in an aircraft utilising the ground station of FIG. 1, FIG. 3 is a block schematic diagram of a system according to the present invention, and FIGS. 4 and 5 are waveform diagrams showing waveforms which occur in the systems described with reference to FIGS. 1, 2 or 3.

Referring now to the drawings a reference frequency oscillator is arranged to feed via an isolator 2 a reference aerial 3 and offset generator 4. The offset frequency generator 4 adds or subtracts an offset frequency from the reference frequency to produce a scanning frequency which is fed to digitisation control unit 5 and a commutator 6 which feeds the elements of a multi-element aerial array 7. The offset frequency provided by generator 5 is added to or subtracted from the reference frequency in accordance with the direction of scan along the vertically disposed elements of the linear aerial array 7. Typically the offset frequency might be 50 KHz and the reference frequency 5,000 MHz. The digitisation control device 5 is arranged to advance or retard the phase of the signal fed from the offset frequency generator in fixed small increments at intervals. This practice of digitisation is well known and consists in inserting predetermined phase changes in the signal so that the cusps hereinbefore referred to occur more regularly and therefore do not interfere with operation of the system. The advantage of digitisation will be discussed more fully later.

In practice the offset generator 4 and the digitisation control unit 5 may very well be inserted in the feed to the reference aerial 3 because it is only differences between the two radiating signals which provide relevant information.

FIG. 2 shows an airborne receiver associated schematically with an aircraft shell and adapted to process signals emanating from the ground station as described with reference to FIG. 1. Following a conventional radio receiver comprising a mixer, a local oscillator and amplifier 8 and detector 9 a doppler frequency filter 10 is provided which separates the unwanted frequencies from interference. This signal is then processed by a zero crossing counter 11 although as an alternative a spectrum analyser 12 could be used. The zero crossing counter is used to count the number of zero crossing in the beat frequency so that a count state is produced which is related to doppler shift frequency and thus to aircraft slope approach angle.

FIG. 4 (c) shows a waveform appertaining to the system described with reference to FIGS. 1 and 2 and represents a detected signal frequency waveform in an airborne receiver derived from the combination of scanned and referenced frequency signals. The beat frequency which obtains between the two signals results partly from the offset frequency and partly from the doppler effect due to the apparent aerial movement produced by commutation. At angles close to the system axis the beat frequency will almost entirely be due to the offset frequency but when an aircraft is offset substantially from the system axis this will not be the case and doppler shift will become increasingly apparent. The mirror image effect about scan reversal line 13 is due to the fact that on the up-scan the offset frequency is added to the reference frequency and on the down-scan subtracted from it. The reasons for this are to ensure that the doppler shift on the beat frequency is always in the same direction irrespective of whether its source is apparently moving upwards or downwards and shift effect on unwanted ground reflection is always in the opposite direction so that the spurious signals can be rejected by a filter as for example the filter 10 as shown in FIG. 2 which accepts only that range of beat frequencies corresponding to those required. This is fully described in the reference hereinbefore referred to (Electrical Communication).

With increase of elevation of the receiver in an aircraft, a component of frequency due to the apparent movement of the aerial is added to the offset frequency and it is this frequency which provides information for the elevation angle.

There are a number of known ways in which the adverse effect of ground reflection can be, to some extent, alleviated, firstly an increase of the array height dimensions will reduce the spectral line width but this increases the cost and the degree of airfield obstruction. Secondly, by modulating the signal amplitude during the scan it is possible to reduce the effective width of the spectral line and this requires a more powerful transmitter to be used to maintain an acceptable signal to noise ratio. It is one aim of the present invention to obtain reduced spectral line width without the aforesaid disadvantages of the known methods. Alternatively it may be applied in addition to these other methods to obtain a further improvement.

One proposed system according to the present invention is hereinafter described in FIG. 3 which avoids the discontinuity or cusps 14 shown in FIG. 4 which may occur at the lower end of the scan sequence. As the scan reversal point is reached as indicated by the line 13 in FIG. 4 the scanning frequency is shifted to the other side of the reference frequency and therefore moved by twice the offset frequency. This results in discontinuities such as the cusps 14 being produced unless the frequency change is effected in accordance with the invention at a point of a peak in the beat frequency.

The system of FIG. 3 comprises feeding via an isolator 15 corresponding to the isolator 7 of FIG. 1 on the one hand a reference signal to a reference aerial 16 and on the other hand via an offset generator 17, a digitiser 18 and a commutator 19, scanning signals to a scanned aerial array (not fully shown) comprising a lower element 20 which is directly adjacent to the reference aerial 16. Two couplers 21 and 22 are provided which extract a small proportion of energy radiated from the reference aerial 16 and the lower element 20 of the scanned aerial array. The phases of these signals are compared in a discriminator 23 and fed to a phase detector 24 and a gate 25 so that when they are phase coincident or phase reversed a pulse is passed from the control circuit 26 to operate the offset generator 23. This causes the offset frequency to be added to the reference frequency instead of being subtracted therefrom or vice versa. Operation of the control circuit 26 at the correct time is ensured by an enable pulse fed from the commutator 19 only when the lower element 20 of the aerial array is being fed with the scanning frequency by the commutator 19, signals from the commutator 19 indicative of the scanning direction being fed to the offset generator 17 over a line 40 to ensure a frequency step in the required direction according to the direction of scan.

Operation of the circuit will be better understood from consideration of the waveform diagrams of FIG. 4.

FIG. 4 (a) shows a stepped waveform illustrating schematically the time spent supplying the scanning frequency to each of the lower elements of the array. The lowest step between the points 27 and 28 is the period during which the scanning frequency is applied to the lowest element 20 of the array. During this period the enable pulse shown in waveform 4b is applied from the commutator to the gate 25. Waveform 4c has already been discussed and shows the cusp 14 which occurs when the scan reversal and the frequency change of the offset generator 17 are effected at the same time. Waveform 4d on the other hand shows that if the frequency of the offset generator 17 is changed at the point 29 within the period of the enable pulse shown in waveform 4b and when the rate of change of amplitude in the doppler waveform is zero, then no cusp or discontinuity is apparent. Waveform 4e shows another case when the peak 30 occurs after the point of scan reversal and shows that once again no cusp is present.

It will be appreciated that by using a system according to the invention cusps occurring during scan reversals at the bottom of the aerial are removed.

In order to improve the performance still further, the adverse effect of cusps occurring due to scan reversals at the top end of the aerial may be minimised by providing digitisation at these points. This is illustrated in waveforms 5a and 5b.

At this juncture it is appropriate to explain more fully the effect produced by digitisation or adding small phase changes to the detected waveform. It will be seen from waveform 4c that the cusp 14 has no obvious effect as shown since it does not cut the zero line and does not represent a zero crossing, and is therefore not taken account of by the zero crossing counter. If however the slope approach angle of an aircraft changles slightly the doppler waveform received by the aircraft shifts slightly and the cusp may very easily extend across the zero line and result in a count change. The cusps are particularly inconvenient when they arrive in batches thereby causing the count registered by the zero crossing counter to jump in large steps. Digitisation is introduced to distribute more evenly the occurrence of these cusps.

Waveforms 5a and 5b show a detected doppler waveform wherein scan reversal in the waveform has been effected at peaks 31, 32, 33 and 34 in order to overcome the effect of cusps at phase reversals at the bottom end. At the opposite end of the scan, digitisation is provided on alternate tops as shown in FIG. 5a at points 35 and 36, i.e. at these points small predetermined phase changes are introduced. Waveform 5b on the other hand shows the effect of introducing digitisation at points 37, 38 and 39, i.e. digitisation on all tops or all points where the scan is reversed at the top end of the aerial.

Digitisation in itself is well known but when used in combination with the invention a particularly efficient doppler M.L.S. system may be provided.

What we claim is:

1. A ground station of a doppler microwave radar system comprising an aerial array having a plurality of elements and adjacent one end of said array a reference aerial, transmitter means providing the reference aerial with a reference signal and the aerial array with a scanned signal frequency which is offset by a predetermined offset frequency from the reference signal, commutator means operative for feeding said scanned signal sequentially to the elements of the array so that a point from which signal transmission occurs is scanned from one end to the other of said array and back again, and means operative to change the scanned frequency by twice the offset frequency when that element of the array closest to the reference aerial is fed by said commutator and when the rate of change of amplitude of the beat frequency difference between the reference frequency and the scanned frequency is zero.

2. A ground station as claimed in claim 1, wherein the reference frequency and the scanned frequency are fed to a phase discriminator operative when the signals applied thereto are in phase or in anti-phase to provide an output signal to gating means fed also from the commutator means with a gating signal when that element of said array closest to the reference aerial is fed from said commutator, the gating means being effective for providing a gating signal to effect a frequency change of the scanning frequency when coincident signals are applied to said gating means.

3. A ground station as claimed in claim 1, wherein a digitiser is provided to introduce from time to time phase changes in the phase relationship between the reference frequency and the scanning frequency.

* * * * *